United States Patent
Kim

[19]

[11] Patent Number: 5,977,671

[45] Date of Patent: Nov. 2, 1999

[54] MOTOR ASSEMBLY FOR DRIVING A FAN OF A GAS BOILER

[75] Inventor: Sung-Kee Kim, Kyeongki-Do, Rep. of Korea

[73] Assignee: Daewoo Electronics Co., Ltd., Seoul, Rep. of Korea

[21] Appl. No.: 09/132,907

[22] Filed: Aug. 12, 1998

[30] Foreign Application Priority Data

Oct. 7, 1997 [KR] Rep. of Korea ................. U 97-27817

[51] Int. Cl.6 ................................................. H02K 5/00
[52] U.S. Cl. ............................ 310/89; 310/101; 310/91; 310/43; 310/216
[58] Field of Search ............................... 310/89, 101, 91, 310/43, 216

[56] References Cited

U.S. PATENT DOCUMENTS

| | | | |
|---|---|---|---|
| 4,928,029 | 5/1990 | Wright | 310/89 |
| 4,955,128 | 9/1990 | Sogabe et al. | 29/596 |
| 4,982,125 | 1/1991 | Shirakawa | 310/88 |
| 5,053,664 | 10/1991 | Kikuta et al. | 310/114 |
| 5,780,951 | 7/1998 | Stephens | 310/172 |

*Primary Examiner*—Nestor Ramirez
*Assistant Examiner*—Thanh Lam
*Attorney, Agent, or Firm*—Pillsbury Madison & Sutro LLP

[57] ABSTRACT

An fan motor assembly for driving a fan of a gas boiler. The motor assembly has a core having a hollow portion at a center thereof, a coil assembly for magnetizing the core by applying an electric current to the core, a rotor rotatably disposed in the hollow portion of the core and having a rotating shaft including a first shaft which extends towards a fan so as to be coupled with the fan and a second shaft which extends opposite to the first shaft, a first cover attached to a front surface of the core and having a first bearing therein for rotatably supporting the first shaft of the rotating shaft, and a second cover attached to a rear surface of the core and formed at an inner portion thereof with a first recess for installing a second bearing for rotatably supporting the second shaft of the rotating shaft and a second recess for installing a printed circuit board on which a sensor for detecting revolutions per minute of the rotor is mounted. The motor assembly has a simple construction and can be easily assembled so that not only are the assembling steps and assembling time reduced, but also the manufacturing cost is saved.

8 Claims, 8 Drawing Sheets

MOTOR ASSEMBLY FOR DRIVING A FAN OF A GAS BOILER

BACKGROUND OF THE INVENTION

1. Field of the Invention

The present invention relates to a gas boiler, and more particularly to a motor assembly for driving a fan of a gas boiler.

2. Description of the Prior Art

Generally, a gas boiler boils a fluid such as a water by burning a fuel such as a gas or an air and circulates the boiled fluid to raise the room temperature or to supply a hot water. The gas boiler system is widely used for the purpose of heating a room or a building. In the gas boiler system, the fluid is supplied from a fluid source into a fluid tank through a fluid inlet. The fluid supplied into the fluid tank circulates through a heating pipe via a fluid outlet and a heat exchanger by means of a circulation pump, thereby raising the temperature of a room in which the heating pipe is installed.

As is well known, in the gas boiler system, a gas is introduced into a combustion chamber through a manifold and a burner and is mixed with an air which is introduced into the combustion chamber from the exterior through an air inlet. The mixed gas and air is burned in the combustion chamber and the combustion gas thereof is exhausted into the exterior through an exhaust hood. In the above gas boiler system, the air is introduced into the combustion chamber by means of a fan rotated by a motor assembly.

Figure 1:
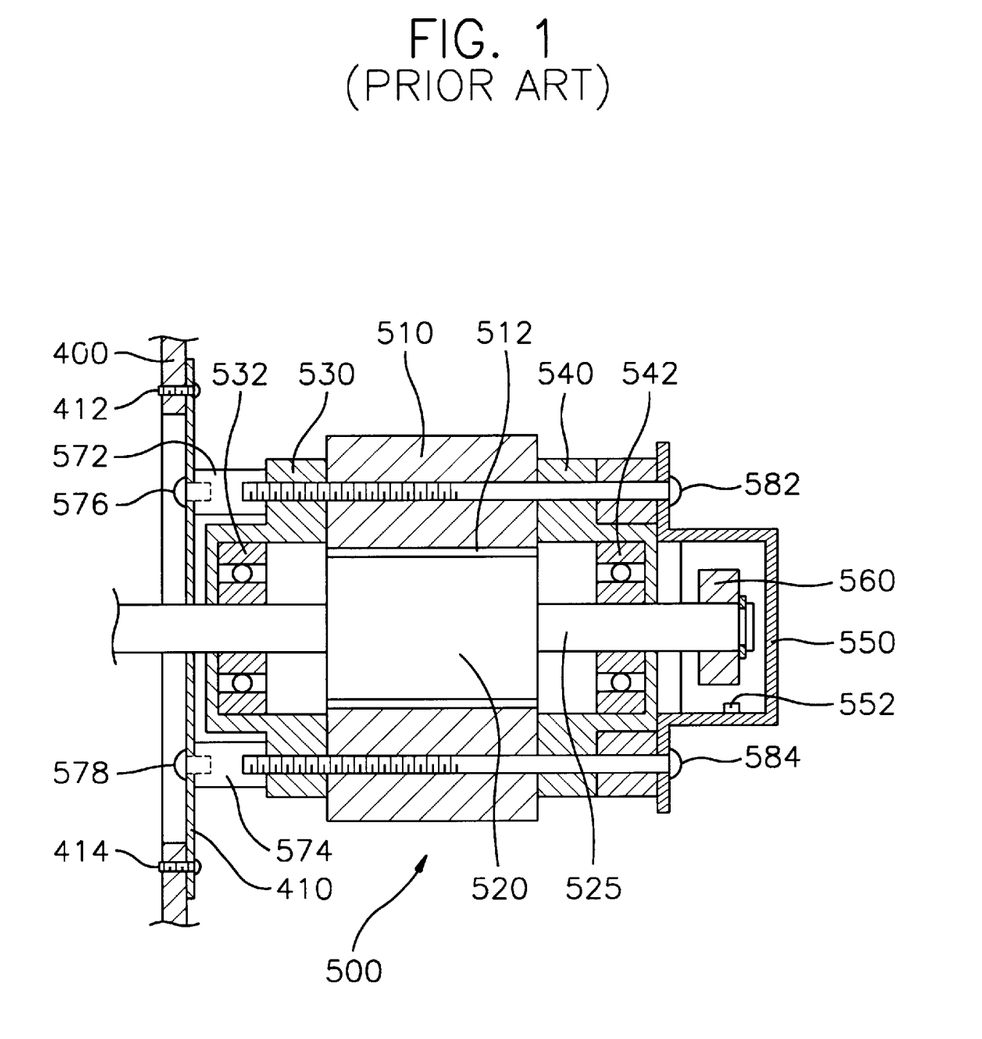
FIG. 1 is a sectional view showing an internal structure of a conventional motor assembly.

FIG. 1 shows a conventional motor assembly 500 for rotating a fan installed in the gas boiler.

As shown in FIG. 1, motor assembly 500 has a hollow core 510 which is coupled to a coil assembly (not shown) and is magnetized when an electric current is applied to the coil assembly. Hollow core 510 has a hollow portion 512 in which a rotor 520 having a rotating shaft 520 is rotatably installed. A first end of rotating shaft 525 is coupled to a fan (not shown) so that the fan can be rotated together with rotor 520.

Rotor 520 rotates by an electromagnetic action created between rotor 520 and the coil assembly when the current is applied to the coil assembly. In order to allow rotor 520 to be easily rotated, rotor 520 does not make contact with an inner wall of hollow portion 512 when it is installed in hollow portion 512.

A first cover 530 having a first bearing 532 for rotatably supporting the first end of rotating shaft 520 is attached to a front surface of hollow core 510. In addition, a second cover 540 having a second bearing 542 for rotatably supporting the second end of rotating shaft 520 is attached to a rear surface of hollow core 510.

In order to fix motor assembly 500 to a fan casing 400, a motor fixing plate 410 is coupled to fan casing 400 by means of a pair of screws 412 and 414. Upper and lower projections 572 and 574 are coupled to upper and lower front portions of motor fixing plate 410 by means of a pair of screws 576 and 578, respectively. Motor assembly 500 is screw-coupled to upper and lower projections 572 and 574 so that motor assembly 500 can be suspended in the gas boiler.

On the other hand, a cap 550 is attached to a rear surface of second cover 540. The second end of rotating shaft 525 around which a magnetic ring 560 is disposed extends to an inside of cap 550 so that the second end of rotating shaft 525 is protected by cap 550. On the inside of cap 550, there is installed an HALL sensor 552 which makes the electromagnetic interaction with magnetic ring 560 in such a way to detect an R.P.M. of rotor 520.

In addition, a first elongated screw 582 is screwed into upper projection 572 passing through upper portions of cap 550, second cover 540, hollow core 510 and first cover 530. A second elongated screw 584 is screwed into lower projection 574 passing through lower portions of cap 550, second cover 540, hollow core 510 and first cover 530, so that the above elements are integrally coupled with each other.

In conventional motor assembly 500 having the above construction, when the electric current is applied to a coil of the coil assembly, core 510 is magnetized so that rotor 520 rotates. As rotor 520 rotates, the fan coupled to the first end of rotating shaft 525 also rotates so that the air flows into a combustion chamber of the gas boiler.

The air flowed into the combustion chamber is mixed with the gas. The mixed gas and air is burned by a burner and the combustion gas thereof is exhausted into the exterior through an exhaust port.

However, conventional motor assembly 500 needs to assemble to cap 550, second cover 540, hollow core 510, and first cover 530 by first and second elongated screws 582 and 584 after installing HALL sensor 552 in cap 550, so that assembling steps and assembling time are increased.

In addition, since conventional motor assembly 500 requires a separate element, such as cap 550 for installing HALL sensor 552 therein, the manufacturing cost of conventional motor assembly 500 is increased.

SUMMARY OF THE INVENTION

The present invention has been made to overcome the above described problem of the prior art, and accordingly, it is an object of the present invention to provide a motor assembly for a gas boiler which has a simple construction and can be easily assembled so that not only are the assembling steps and assembling time reduced, but also the manufacturing cost thereof is saved.

To accomplish the above object, the present invention provides a fan motor assembly comprising:

a core having a hollow portion at a center thereof;

a coil assembly for magnetizing the core by applying an electric current to the core;

a rotor rotatably disposed in the hollow portion of the core and having a rotating shaft including a first shaft extends towards a fan so as to be coupled with the fan and a second shaft extends opposite to the first shaft;

a first cover attached to a front surface of the core and having a first bearing therein for rotatably supporting the first shaft of the rotating shaft; and a second cover attached to a rear surface of the core and formed at an inner portion thereof with a first recess for installing a second bearing for rotatably supporting the second shaft of the rotating shaft and a second recess for installing a printed circuit board on which a sensor for detecting revolutions per minute of the rotor is mounted.

According to the preferred embodiment of the present invention, the core is formed at an upper portion thereof with a rectangular groove and the coil assembly includes a bobbin press-fitted into the rectangular groove and a coil wound within the bobbin.

According to the preferred embodiment of the present invention, the motor assembly further comprises a cap for closing the second recess and a pair of elongated screws for attaching the core, the first cover and the second cover to a fan casing by integrally assembling the core, the first cover and the second cover to each other.

The second cover is formed at a rear surface thereof with a slot which surrounds the second recess, and the cap is integrally provided at a periphery thereof with a bending portion which is press-fitted into the slot.

When the electric current is applied to the coil of the coil assembly, the core is magnetized so that the rotor rotates. As the rotor rotates, the fan coupled to the first shaft of the rotating shaft also rotates so that the air flows into a combustion chamber of a gas boiler through an air inlet and the fan.

The air flowed into the combustion chamber is mixed with the gas. The mixed gas and air is burned by a burner and the combustion gas thereof is exhausted into the exterior through an exhaust port.

As described above, the motor assembly of the present invention has a simple construction and can be easily assembled so that not only are the assembling steps and assembling time reduced, but also the manufacturing cost is saved.

BRIEF DESCRIPTION OF THE DRAWINGS

The above object and other advantages of the present invention will become more apparent by describing in detail the preferred embodiments thereof with reference to the attached drawings, in which.

DESCRIPTION OF THE PREFERRED EMBODIMENT

Hereinafter, a preferred embodiment of the present invention will be described in detail with reference to the accompanying drawings. In the description, the same elements have the same reference numbers.

Figure 2:
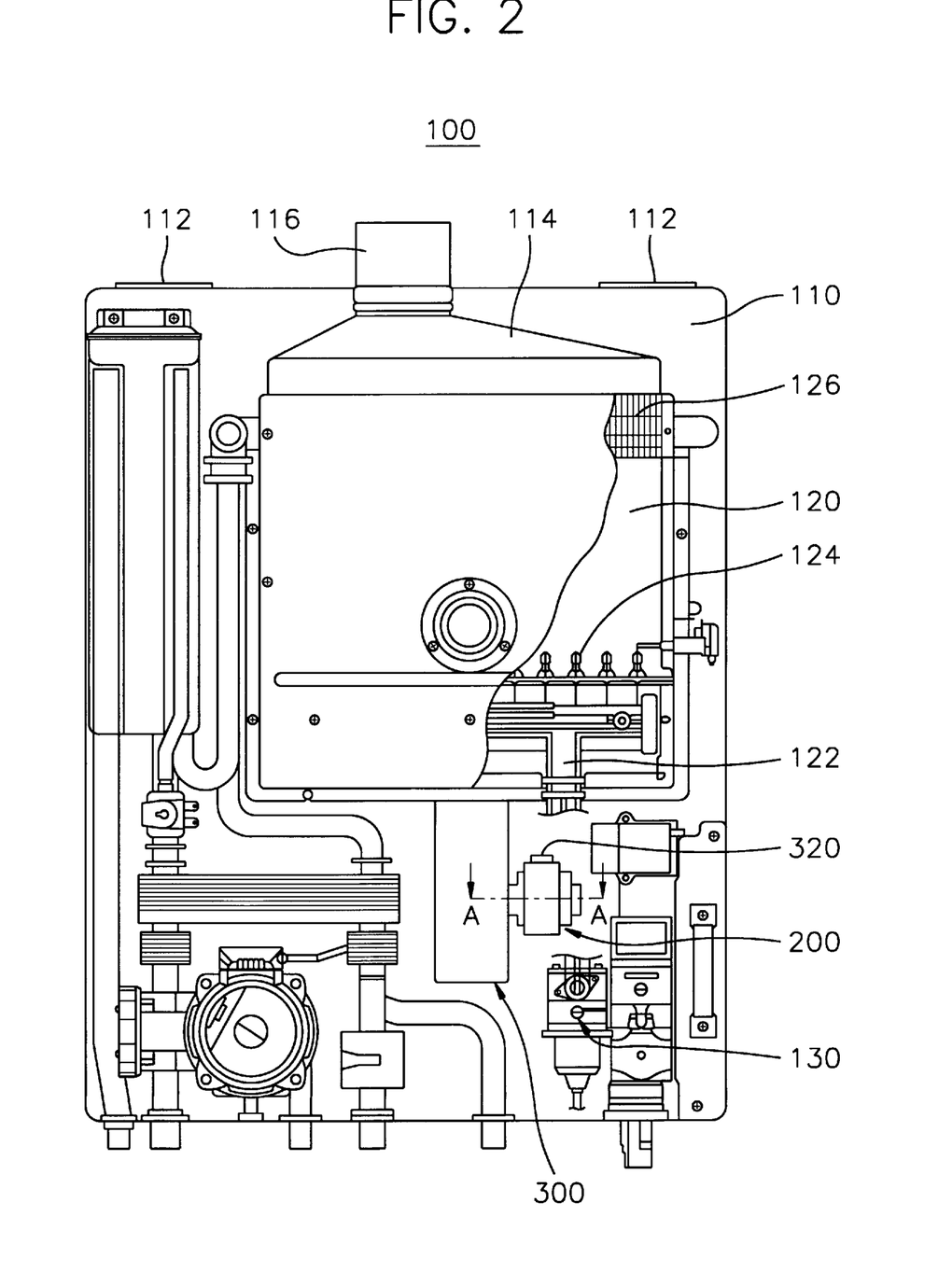
FIG. 2 is a partially sectional view showing an internal structure of a gas boiler equipped with a motor assembly according to a first embodiment of the present invention.

FIG. 2 shows a gas boiler 100 equipped with a motor assembly 200 according to a first embodiment of the present invention. As shown in FIG. 2, gas boiler 100 has a housing 110 formed with a combustion chamber 120 in which an air and a gas are mixed and burned.

At a bottom of housing 110, there is installed a gas valve 130 for supplying the gas into combustion chamber 120. The gas is supplied into combustion chamber 120 from a gas source through gas valve 130, a manifold 122 formed at a bottom of combustion chamber 120 and a burner 124 installed at a lower portion of combustion chamber 120.

In addition, a fan assembly 300 for introducing the air into combustion chamber 120 is provided at an underside of combustion chamber 120. Motor assembly 200 is attached to one side of fan assembly 300 in order to rotate a fan (not shown) installed in the fan assembly. Disposed in the upper portion of motor assembly 200 is a coil assembly 320. Coil assembly 320 will be more detailedly described below with reference to FIG. 4.

When the fan is rotated by motor assembly 200, the air is flowed into housing 100 through air inlets 112 and then introduced into combustion chamber 120 passing through the fan.

The air introduced into combustion chamber 120 is mixed with the gas. The mixed gas and air is burned in combustion chamber 120 and the combustion gas thereof is exhausted out of gas boiler 100 through an exhaust hood 114 and an exhaust port 116 after making a heat-exchange with a heat exchanger 126 provided at the upper portion of combustion chamber 120.

Figure 3:
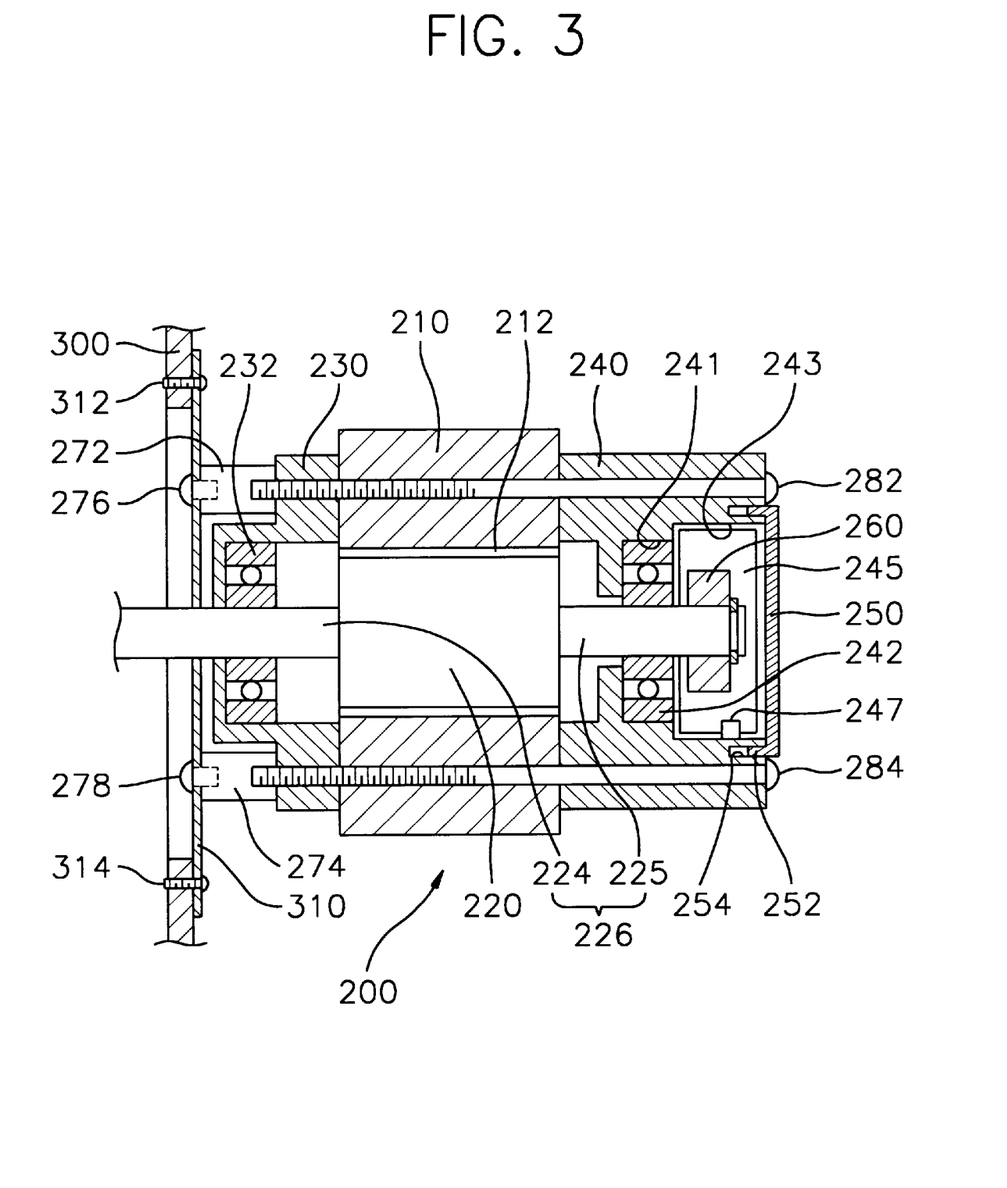
FIG. 3 is a sectional view taken along line A—A in FIG. 2 for showing a construction of a motor assembly according to a first embodiment of the present invention.

FIG. 3 shows a construction of motor assembly 200 according to the first embodiment of the present invention, in detail. As shown in FIG. 3, motor assembly 200 has a hollow core 210 which is coupled to coil assembly 320 and is magnetized when an electric current is applied to coil assembly 320.

Figure 4:
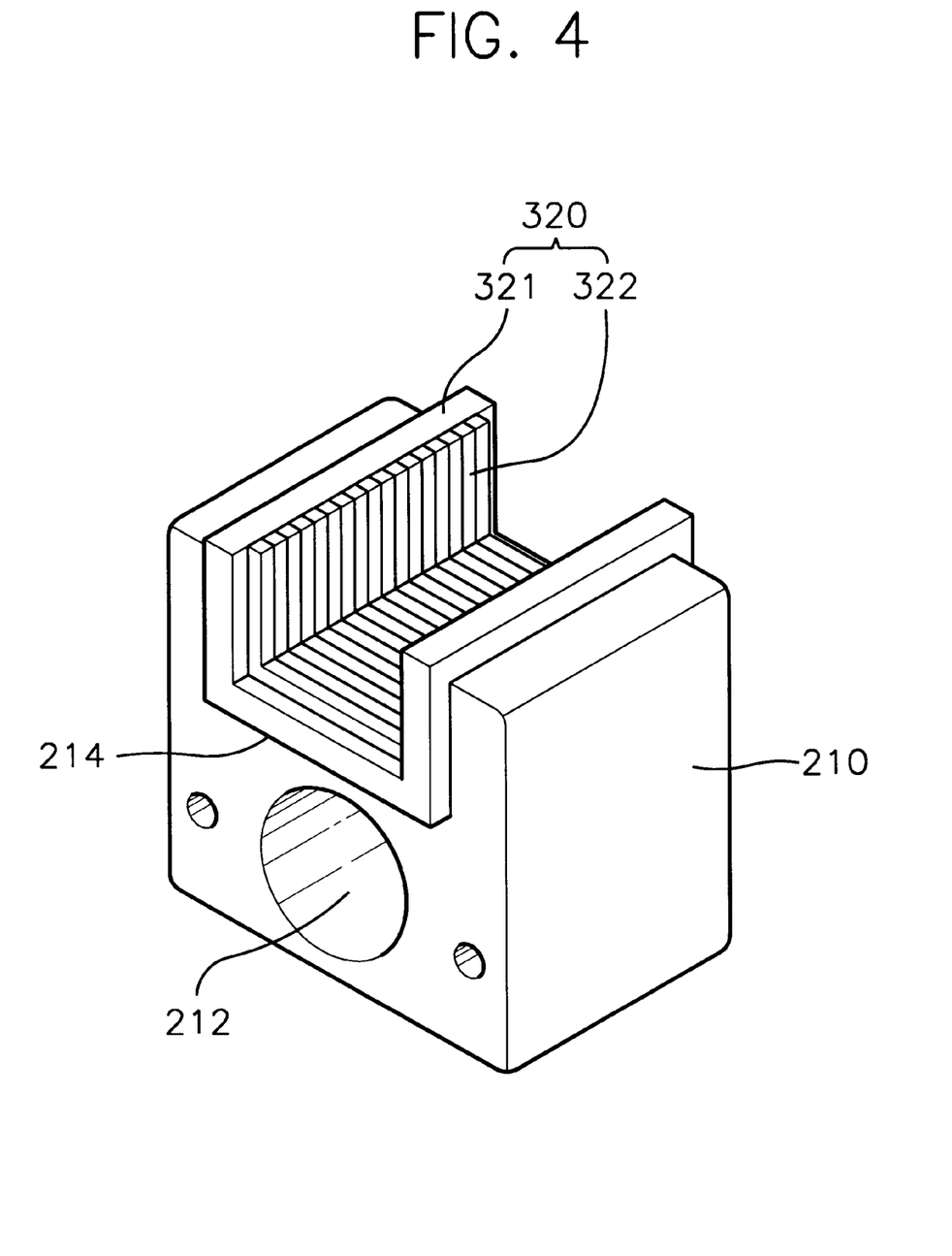
FIG. 4 is a perspective view showing a core of a motor assembly coupled with a coil assembly according to the present invention.

Referring to FIG. 4, hollow core 210 has a rectangular shape having a hollow portion 212 therein and is formed at an upper portion thereof with a rectangular groove 214. Coil assembly 320 includes a bobbin 321 press-fitted into rectangular groove 214 and a coil 322 wound within bobbin 321.

Referring again to FIG. 3, a rotor 220 having a rotating shaft 226 is rotatably installed in hollow portion 212. Rotating shaft 226 includes a first shaft 224 which extends towards the fan so as to be coupled with the fan and a second shaft 225 which extends opposite to first shaft 225. Accordingly, the fan can be rotated together with rotor 220 when rotor 220 rotates.

Rotor 220 rotates by an electromagnetic action created between rotor 220 and coil 322 when the current is applied to coil 322. In order to allow rotor 220 to be easily rotated, rotor 220 installed in hollow portion 212 does not make contact with an inner wall of hollow portion 212.

A first cover 230 having a first bearing 232 for rotatably supporting first shaft 224 of rotating shaft 226 is attached to a front surface of hollow core 210. In addition, a second cover 240 is attached to a rear surface of core 210. Second cover 240 is formed at an inner portion thereof with a first recess 241 for installing a second bearing 242 for rotatably supporting second shaft 225 of rotating shaft 226 and a second recess 243 for installing a printed circuit board 245 on which an HALL sensor 247 for detecting revolutions per minute of rotor 210 is mounted.

Second shaft 225 extends into second recess 243 and is provided at an end thereof with a magnetic ring 260 which makes an electromagnetic interaction with HALL sensor 247. By installing printed circuit board 245 and HALL sensor 247 in second recess 243 of second cover 240, a separate member for installing them is not required so that elements and assembling steps of motor assembly 200 can be reduced.

In order to fix motor assembly 200 to fan assembly 300, a motor fixing plate 310 is coupled to fan assembly 300 by means of a pair of screws 312 and 314. Upper and lower projections 372 and 374 are coupled to upper and lower front portions of motor fixing plate 310 by means of a pair of screws 376 and 378, respectively. It is also possible to integrally form motor fixing plate 310 and upper and lower projections 372 and 374.

A first elongated screw 282 is screwed into upper projection 272 passing through upper portions of second cover 240, hollow core 210 and first cover 230 and a second elongated screw 284 is screwed into lower projection 374 passing through lower portions of second cover 240, hollow core 210 and first cover 230, so that the above elements are integrally coupled with each other and motor assembly 200 can be attached to fan assembly 300.

Figure 6:
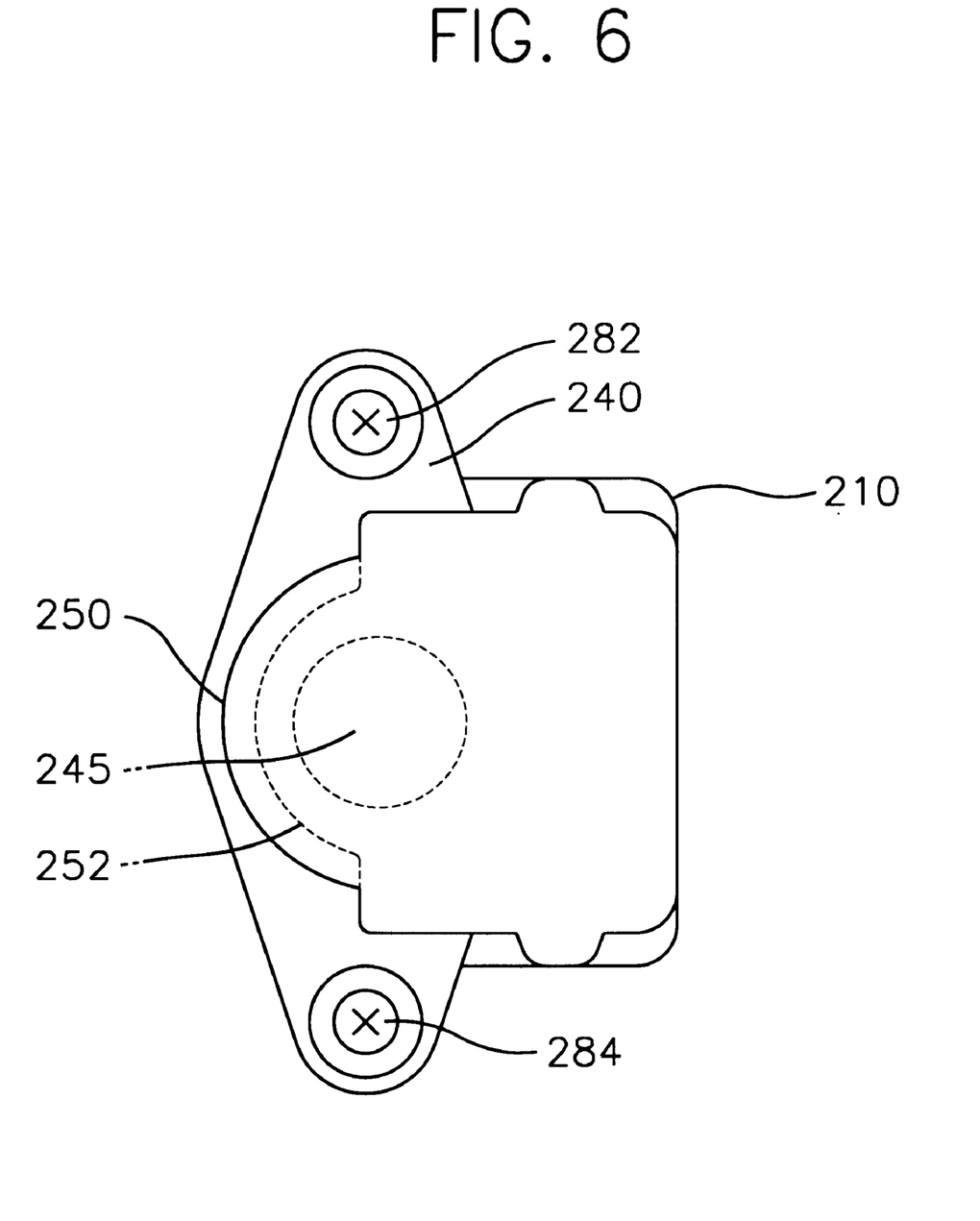
FIG. 6 is a side view of a motor assembly according to the first embodiment of the present invention.

In addition, motor assembly 200 further comprises a cap 250 for closing second recess 243. Cap 250 is integrally provided at a periphery thereof with a bending portion 252. Bending portion 252 is press-fitted into a slot 254, which is formed at a rear surface of second cover 240 in such a manner that it surrounds second recess 243, so that cap 250 can be securely fixed to second cover 240. FIG. 6 is a view for showing cap 250 coupled to the rear surface of second cover 240. As is shown in FIG. 6, an external appearance of motor assembly 200 is improved by cap 250.

Figure 5:
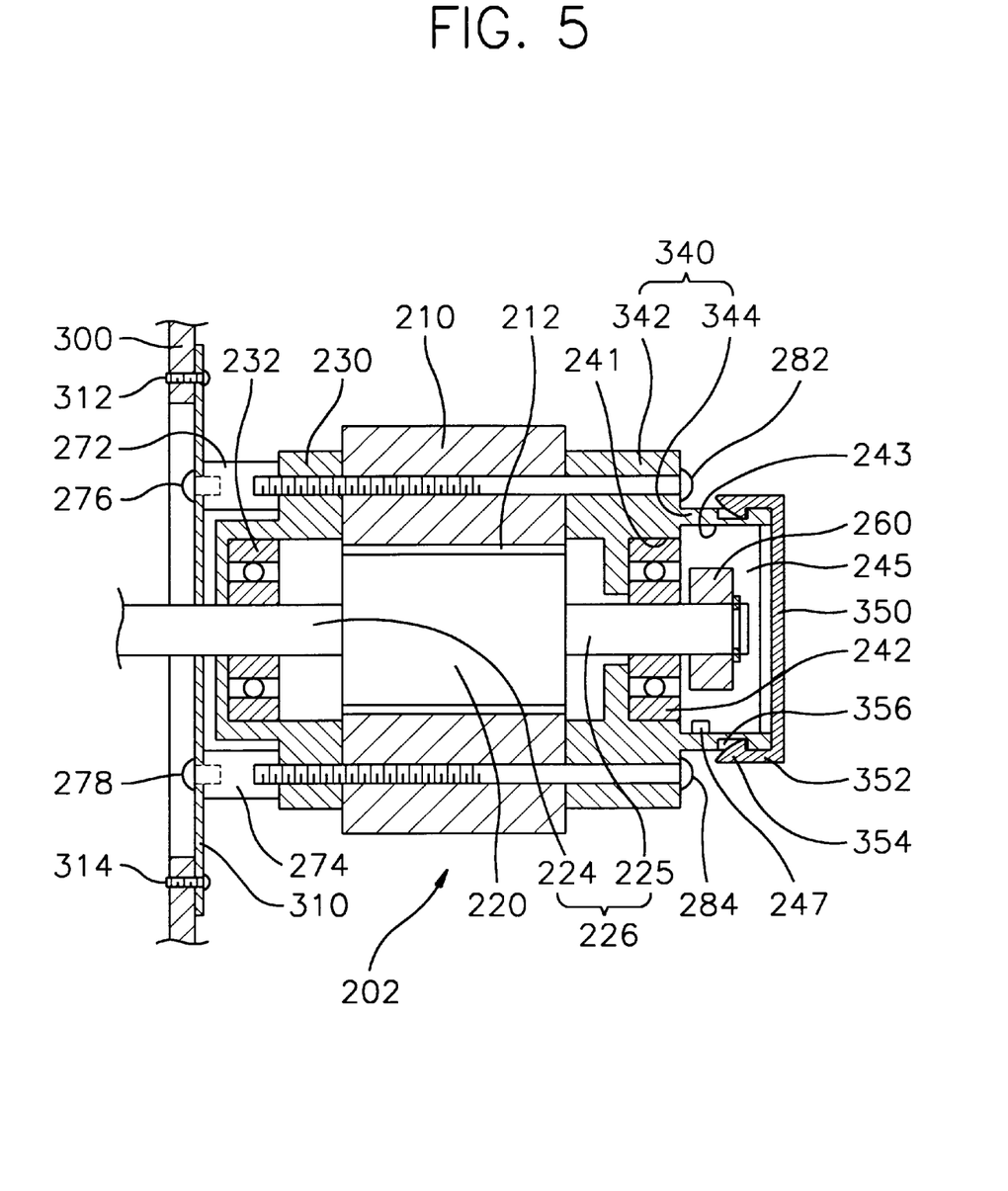
FIG. 5 is a sectional view showing a construction of a motor assembly according to a second embodiment of the present invention.

On the other hand, FIG. 5 shows a motor assembly 202 according to the second embodiment of the present invention. Motor assembly 202 according to the second embodiment has the same structure as the structure of motor assembly 200 according to the first embodiment of the present invention, except for the structures of a second cover 340 and a cap 350.

As shown in FIG. 5, second cover 340 includes an oval shaped member 342 in which first recess 241 is formed and a cylindrical member 344 which is integrally formed at a rear surface of oval shaped member 342 and in which second recess 343 is formed. Preferably, cylindrical member 344 has a size smaller than a size of oval shaped member 342.

Cylindrical member 344 is formed at an outer surface thereof with an annular slot 356 and cap 350 is integrally provided at a periphery thereof with a bending portion 352 which is inserted into annular slot 356. In addition, bending portion 352 is integrally formed at an end thereof with a hook 354 which is elastically inserted into annular slot 356 and fixed therein.

Figure 7:
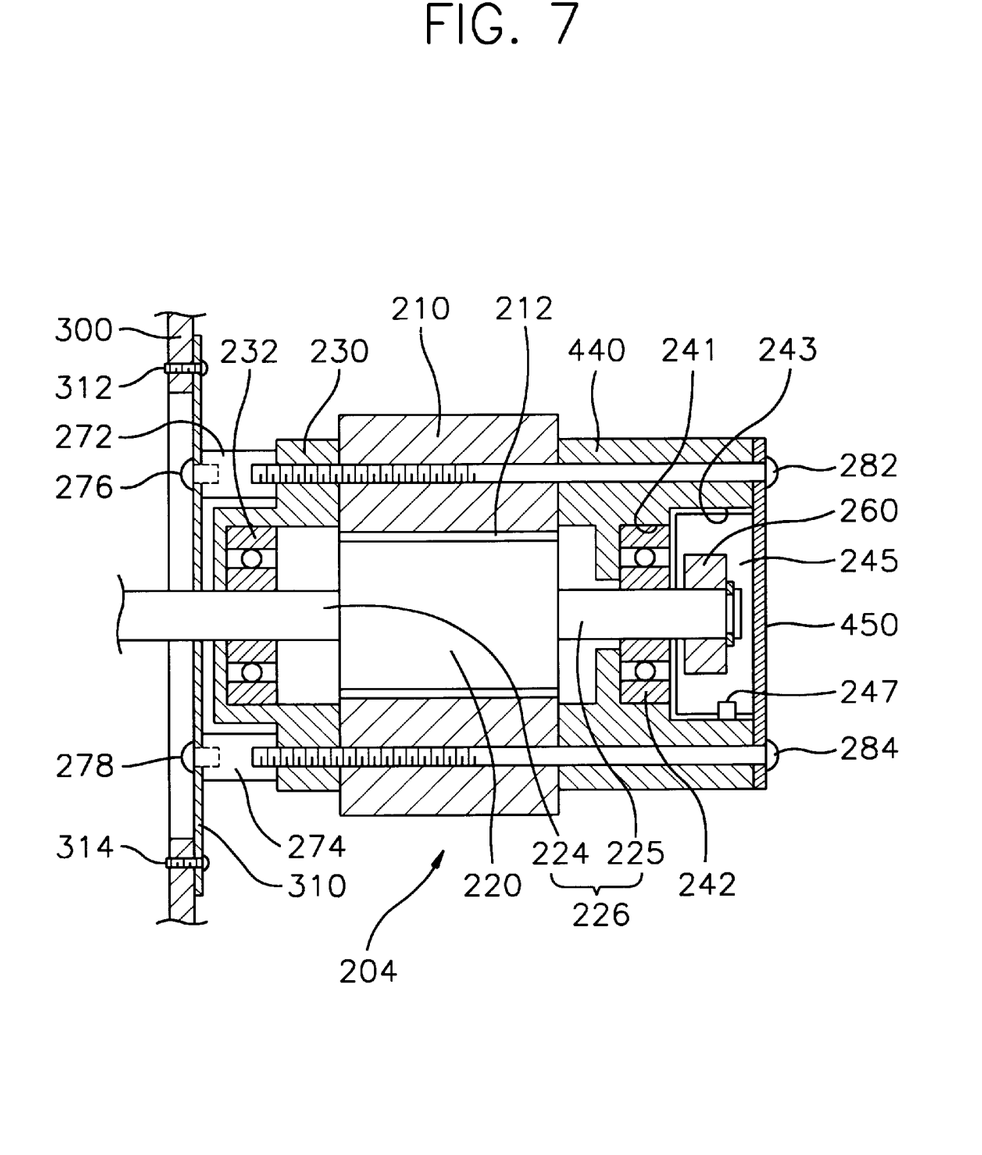
FIG. 7 is a sectional view showing a construction of a motor assembly according to a third embodiment of the present invention.

In addition, FIG. 7 shows a motor assembly 204 according to the third embodiment of the present invention. Motor assembly 204 according to the third embodiment has the same structure as the structure of motor assembly 200 according to the first embodiment of the present invention, except for the structures of a second cover 440 and a cap 450.

Figure 8:
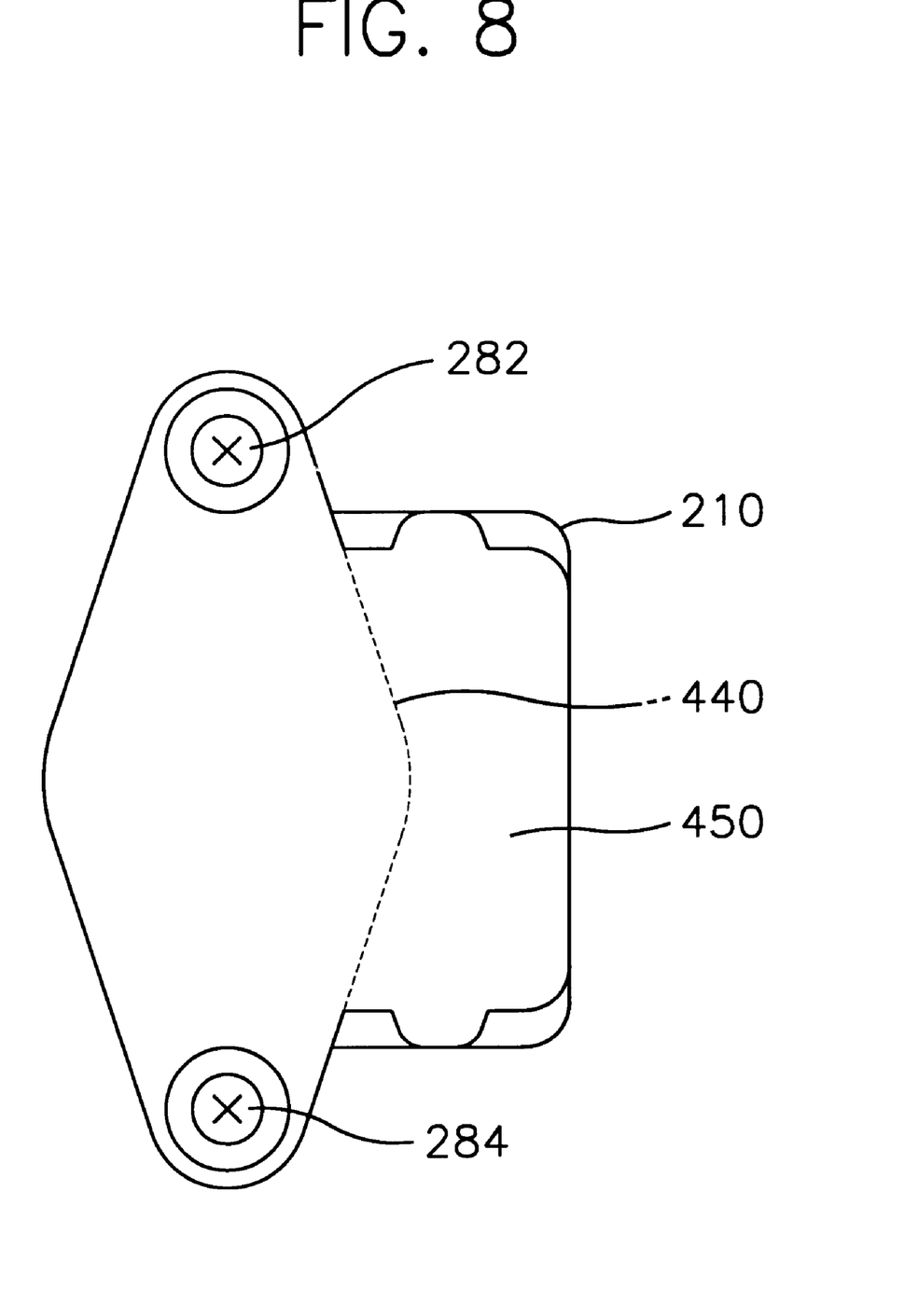
FIG. 8 is a side view of a motor assembly according to the third embodiment of the present invention.

As shown in FIG. 7, second cover 440 of motor assembly 204 has no slot 254 shown in FIG. 3. Instead of that, cap 450 is fixedly coupled to the rear surface of second cover 440 by means of pair of elongated screws 282 and 284. FIG. 8 is a view for showing cap 450 coupled to the rear surface of second cover 440. As shown in FIG. 8, cap 450 includes a portion having a shape corresponding to a shape of second cover 440.

In motor assemblies 200, 202 and 204 having the above constructions, when the electric current is applied to coil 322 of coil assembly 320, core 210 is magnetized so that rotor 220 rotates. As rotor 220 rotates, the fan coupled to first shaft 224 of rotating shaft 226 also rotates so that the air is flowed into combustion chamber 120 of gas boiler 100 through air inlet 112 and the fan.

The air flowed into combustion chamber 120 is mixed with the gas. The mixed gas and air is burned by burner 124 and the combustion gas thereof is exhausted into the exterior through exhaust port 116.

As described above, the motor assembly of the present invention has a simple construction and can be easily assembled so that not only are the assembling steps and assembling time reduced, but also the manufacturing cost is saved.

While the present invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A fan motor assembly comprising:

a core having a hollow portion at a center thereof;

a coil assembly for magnetizing the core by applying an electric current to the core;

a rotor rotatably disposed in the hollow portion of the core and having a rotating shaft including a first shaft which extends towards a fan so as to be coupled with the fan and a second shaft which extends opposite to the first shaft;

a first cover attached to a front surface of the core and having a first bearing therein for rotatably supporting the first shaft of the rotating shaft;

a second cover attached to a rear surface of the core and formed at an inner portion thereof with a first recess for installing a second bearing for rotatably supporting the second shaft of the rotating shaft and a second recess for installing a printed circuit board on which a sensor for detecting revolutions per minute of the rotor is mounted; and a cap for closing the second recess and a pair of elongated screws for attaching the core, the first cover and the second cover to a fan casing by integrally assembling the core, the first cover and the second cover to each other, wherein the second cover is formed at a rear surface thereof with a slot which surrounds the second recess and the cap is integrally provided at a periphery thereof with a bending portion which is press-fitted into the slot.

2. The fan motor assembly as claimed in claim 1, wherein the core is formed at an upper portion thereof with a rectangular groove and the coil assembly includes a bobbin press-fitted into the rectangular groove and a coil wound within the bobbin.

3. The fan motor assembly as claimed in claim 2, wherein the second shaft extends into the second recess and is provided at an end thereof with a magnetic ring which makes an electromagnetic interaction with the sensor.

4. A fan motor assembly comprising:

a core having a hollow portion at a center thereof;

a coil assembly for magnetizing the core by applying an electric current to the core;

a rotor rotatable disposed in the hollow portion of the core and having a rotating shaft including a first shaft which extends towards a fan so as to be coupled with the fan and a second shaft which extends opposite to the first shaft;

a first cover attached to a front surface of the core and having a first bearing therein for rotatably supporting the first shaft of the rotating shaft;

a second cover attached to a rear surface of the core and formed at an inner portion thereof with a first recess for installing a second bearing for rotatably supporting the second shaft of the rotating shaft and a second recess for installing a printed circuit board on which a sensor for detecting revolutions per minute of the rotor is mounted; and a cap for closing the second recess and a pair of elongated screws for attaching the core, the first cover and the second cover to a fan casing by integrally assembling the core, the first cover and the second cover to each other, wherein the second cover includes an oval shaped member in which the first recess is formed and a cylindrical member which is integrally formed at a rear surface of the oval shaped member and in which the second recess is formed, the cylindrical member having a size smaller than a size of the oval shaped member.

5. The fan motor assembly as claimed in claim 4, wherein the cylindrical member is formed at an outer surface thereof with an annular slot and the cap is integrally provided at a periphery thereof with a bending portion which is inserted into the annular slot.

6. The fan motor assembly as claimed in claim 5, wherein the bending portion is integrally formed at an end thereof with a hook which is elastically inserted into the annular slot and fixed therein.

7. The fan motor assembly as claimed in claim 4, wherein the cap is fixedly coupled to the rear surface of the second cover by means of the pair of elongated screws.

8. The fan motor assembly as claimed in claim 7, wherein the cap has a shape corresponding to a shape of the second cover.

* * * * *